(12) United States Patent
Livingston et al.

(10) Patent No.: US 6,761,155 B2
(45) Date of Patent: Jul. 13, 2004

(54) SEPARATION MEMBRANE CARTRIDGE WITH BYPASS

(75) Inventors: Brian Paul Livingston, Peoria, IL (US); Charles H. Dutart, Washington, IL (US)

(73) Assignee: Caterpillar Inc, Peoria, IL (US)

( * ) Notice: Subject to any disclaimer, the term of this patent is extended or adjusted under 35 U.S.C. 154(b) by 5 days.

(21) Appl. No.: 10/320,716

(22) Filed: Dec. 17, 2002

(65) Prior Publication Data

US 2004/0112349 A1 Jun. 17, 2004

(51) Int. Cl.[7] ................................................. F02B 13/00
(52) U.S. Cl. ........................................ 123/585; 60/274
(58) Field of Search .......................... 123/585; 60/311, 60/297, 291; 297/60, 288

(56) References Cited

U.S. PATENT DOCUMENTS

| 5,595,580 A | * | 1/1997 | Kawamura .................. 55/288 |
| 5,636,619 A | | 6/1997 | Poola et al. |
| 5,649,517 A | | 7/1997 | Poola et al. |
| 5,960,777 A | * | 10/1999 | Nemser et al. ............. 123/585 |
| 6,055,808 A | | 5/2000 | Poola et al. |
| 6,067,973 A | | 5/2000 | Chanda et al. |
| 6,289,884 B1 | | 9/2001 | Blandino et al. |
| 6,453,893 B1 | | 9/2002 | Coleman et al. |
| 6,478,852 B1 | | 11/2002 | Callaghan et al. |
| 6,516,787 B1 | | 2/2003 | Dutart et al. |
| 6,543,428 B1 | | 4/2003 | Blandino et al. |

\* cited by examiner

*Primary Examiner*—Thomas Denion
*Assistant Examiner*—Zelalem Eshete
(74) *Attorney, Agent, or Firm*—Finnegan, Henderson, Farabow, Garrett & Dunner

(57) ABSTRACT

A separation membrane cartridge is configured to separate an intake air flow of an engine into a membrane flow and a bypass flow. The membrane cartridge includes a fibrous section including a plurality of fibers extending from a first end of the membrane cartridge to a second end of the membrane cartridge. The fibers are configured to separate at least a portion of the membrane flow into a permeate flow and a retentate flow. The membrane cartridge also includes a bypass passage extending from the first end to the second end to allow passage of the bypass flow through the membrane cartridge.

22 Claims, 2 Drawing Sheets

SEPARATION MEMBRANE CARTRIDGE WITH BYPASS

TECHNICAL FIELD

The present invention relates to a separation membrane cartridge. More particularly, the present invention relates to a separation membrane cartridge and system for creating a desired air mixture for an internal combustion engine.

BACKGROUND

In recent years, internal combustion engine makers, and in particular diesel engine manufacturers, have been faced with increasingly strict regulatory requirements. Some of these regulations include exhaust emissions, which may take on a number of forms, including visible smoke, particulate matter, and oxides of nitrogen ($NO_x$). As is generally known in the art, particulate matter includes mainly unburned hydrocarbons and soot, whereas $NO_x$ is an uncertain mixture of oxides of nitrogen (mainly NO and some $NO_2$).

The formation of $NO_x$ may occur when nitrogen mixes with excess oxygen that is not burned in the combustion process. Although excess oxygen and high combustion temperatures are beneficial in reducing fuel consumption, oxygen and high temperatures are detrimental in terms of increased $NO_x$ formation. This conflict generally leads engine manufacturers to delicately balance $NO_x$ production with brake specific fuel consumption (BSFC) and particulate matter in order to meet emission regulations. One manner of reducing $NO_x$ formation within the combustion chamber is through airflow management, which may reduce the amount of oxygen available for formation of $NO_x$.

One known air flow management system, disclosed in U.S. Pat. No. 5,649,517 to Poola et al., introduces an enriched nitrogen air mixture into an engine combustion chamber. A semi-permeable gas membrane separates a portion of oxygen from an intake air flow to create the nitrogen enriched air supply for introduction into the combustion chamber. The system includes an intake line and a secondary line, with the semi-permeable gas membrane cartridge located within the secondary line. The intake line and the secondary line reconnect at a mixing chamber, where the nitrogen enriched air supply from the secondary line is reintroduced to the air in the intake line.

As engines become increasingly complex, the need for efficient use of space within the engine increases. The use of extra air conduits places limitations on the space available for other engine components. Further, extra air conduits may require extra maintenance, and may be more difficult to manufacture than systems with fewer conduits. Furthermore, complex airflow management systems may be difficult to control and operate and, therefore, may be less reliable than less complex systems.

Improvements to the air separation systems are needed so that such systems are more simple, more reliable, more durable, and easier to manufacture, install, operate, and maintain. The present invention is directed at overcoming one or more of the problems set forth above.

SUMMARY OF THE INVENTION

According to an exemplary aspect of the disclosure, a separation membrane cartridge is configured to separate an intake air flow of an engine into a membrane flow and a bypass flow. The membrane cartridge includes a fibrous section including a plurality of fibers extending from a first end of the membrane cartridge to a second end of the membrane cartridge. The fibers are configured to separate at least a portion of the membrane flow into a permeate flow and a retentate flow. The membrane cartridge also includes a bypass passage extending from the first end to the second end to allow passage of the bypass flow through the membrane cartridge.

According to another exemplary aspect of the disclosure, a separation system is configured to separate an intake air flow to create a desired air mixture for an engine. The separation system includes a housing having a feed port configured to receive an intake air flow and an exit port configured to output an engine flow. A separation membrane cartridge disposed in the housing may be configured to separate a first portion of the intake air flow into a permeate flow and a retentate flow. The separation system also includes a bypass passage extending through the membrane cartridge from a first end of the membrane cartridge to a second end of the membrane cartridge to allow passage of a second portion of the intake air flow through the membrane cartridge.

In accordance with yet another aspect of the disclosure, a method of creating a desired air mixture for an engine is provided. The method includes receiving an intake flow into a housing, separating a first portion of the intake flow into a permeate flow and a retentate flow, and passing a second portion of the intake flow through a bypass passage extending through a membrane cartridge. The method also includes mixing the retentate flow and the second portion of the intake flow to create an engine flow. The engine flow is outputted from the housing to the engine.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings.

DETAILED DESCRIPTION

Reference will now be made in detail to embodiments of the invention, an example of which is illustrated in the accompanying drawings. Wherever possible, the same reference numbers will be used throughout the drawings to refer to the same or like parts.

Figure 1:
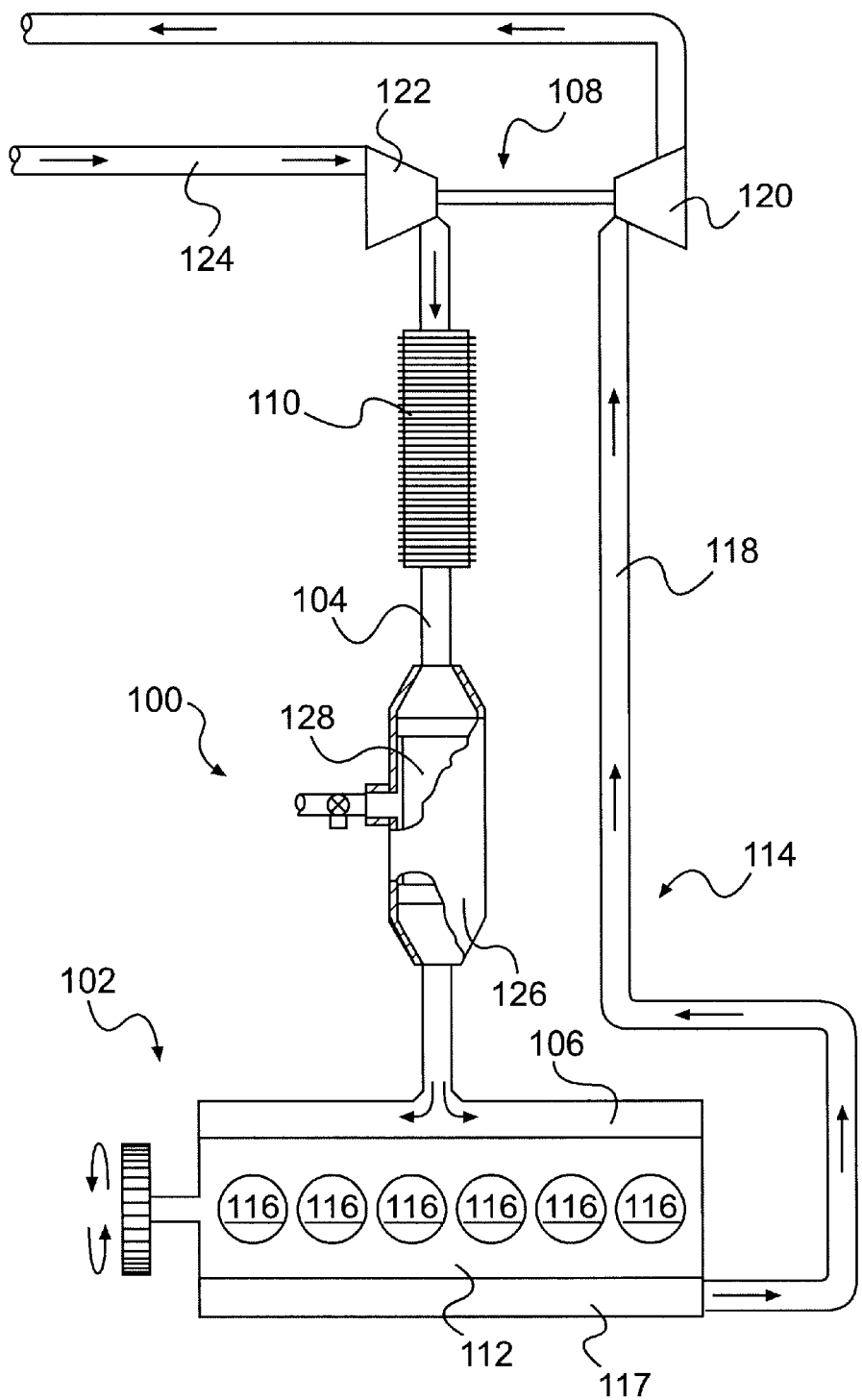
FIG. 1 is a schematic and diagrammatic representation of an internal combustion engine incorporating a separation system in accordance with an exemplary embodiment of the present invention.

FIG. 1 shows a separation system 100 for an engine 102, which may be, for example, a heavy-duty diesel engine. The intake side of the engine 102 may include an intake conduit 104, an intake manifold 106, an intake pressurizing device 108, and a cooling device 110. The pressurizing device 108 may be, for example, a turbocharger having a gas driven turbine 120 which drives an intake compressor 122. The cooling device 110, may be, for example, an inter-cooler or an air-to-air aftercooler (ATAAC). The engine 102 also includes a main combustion section 112 and an exhaust system 114.

The main combustion section 112 may include, among other elements, an engine block and a cylinder head defining a plurality of combustion cylinders 116 therein. Associated with each of the cylinders 116 may be a fuel injector, a cylinder liner, at least one intake port and corresponding intake valves, at least one exhaust gas port and corresponding exhaust valves, and a reciprocating piston moveable within each cylinder to define, in conjunction with the cylinder liner and cylinder head, a combustion chamber. These elements of an engine are well known to those skilled in the art and depiction of such elements in the drawings is unnecessary to understand the disclosed separation membrane cartridge.

The exhaust system 114 of the engine 102 may include an exhaust manifold 117 and an exhaust conduit 118 in communication with the exhaust gas driven turbine 120. Alternatively, the engine may include split exhaust manifolds (not shown). Optionally, the exhaust system 114 may include one or more aftertreatment devices (not shown), such as particulate traps, $NO_X$ absorbers, oxidation and/or lean $NO_X$ catalysts, and other types of exhaust gas aftertreatment systems.

Although the separation system 100 is shown in connection with a six-cylinder, direct injection diesel engine, numerous other engine types are likewise contemplated as suitable engine platforms on which the disclosed invention may be used, including, for example, alternate fuel engines, gasoline engines, natural gas engines, two stroke diesel engines, dual fuel engines, etc. In addition, the engine platform may come in a number of different engine configurations, including "in-line" and "V" type engines, and may have various numbers of cylinders.

As shown in FIG. 1, the intake conduit 104 is in fluid communication with an intake inlet 124, the compressor 122 of the pressurizing device 108, and the cooling device 110. Although the separation system 100 is shown and described in conjunction with a conventional turbocharged engine, the disclosed system is equally useful on engines with a variable geometry turbocharger (VGT) or other supercharged engines, including engines with pressure wave supercharging devices. The intake manifold 106 is connected to an end of the intake conduit 104. In addition, various other devices such as filters, valves, actuators, bypass conduits, etc., although not shown, may also be incorporated within the intake system.

The separation system 100 includes a separation device 126 in line with the separation system 100 of the engine 102. The separation device 126 may contain a selectively permeable separation membrane cartridge 128 that may be adapted to receive substantially all of the ambient combustion fluid as an intake flow. The separation device 126 may divide the intake flow into a permeate flow and an engine flow.

Figure 2:
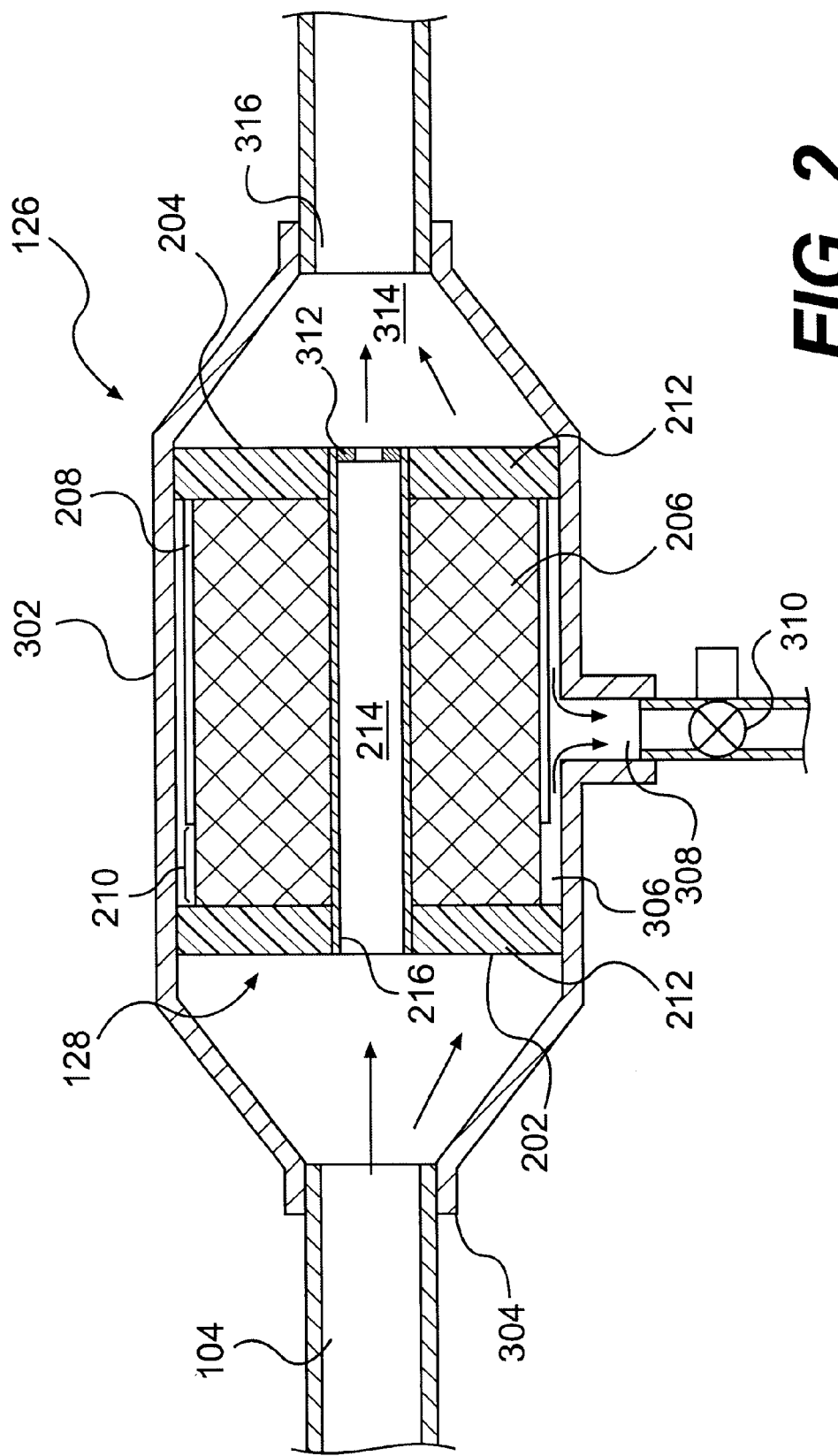
FIG. 2 is a diagrammatic cross-sectional view of the separation device shown in FIG. 1.

FIG. 2 is a cross-sectional view of the separation device 126 of FIG. 1. The separation device 126 may include a housing 302 containing the separation membrane cartridge 128. The housing 302 may include a feed port 304 allowing the intake air to flow into the housing 302. The feed port 304 may be integral with the intake conduit 104, or may be welded or otherwise attached to the intake conduit 104. An exit port 316 is included in the housing 302 and allows the engine flow to exit the housing 302 and flow to the engine intake manifold 106.

The membrane cartridge 128 may be fitted within the housing 102 and may include a first end 202 and a second end 204. An isolated region 306 may be formed between the membrane cartridge 128 and the housing 302, and may be in fluid communication with a permeate flow port 308. A permeate flow regulator 310 may be included at the permeate flow port 308 to regulate fluid flow through the permeate flow port 308.

The membrane cartridge 128 may include a fibrous section having fibers 206. The membrane cartridge 128 may also include tube sheets 212, an outer wrap 208, and a bypass passage 214 formed by a bypass tube 216. The fibers 206 may be selectively permeable membrane elements, and may be disposed in a generally longitudinal or helical (i.e. spiral) orientation extending from the first end 202 to the second end 204. The fibers 206 may extend through the tube sheets 212 to the first and second ends 202, 204 of the membrane cartridge 128, and may be configured so that ends of the fibers 206 are open to incoming fluid flow. The tube sheets 212 may be an epoxy or sealant known in the art, and may firmly secure the ends of the fibers 206 in place. Further, the tube sheets 212 may seal around the outer periphery of the fibers 206 so that fluid is forced to enter into the ends of the fibers 206, rather than flowing between the fibers 206 or along the exterior of the fibers 206. It may be recognized by one skilled in the art that the separation membrane 128 may include thousands of fibers 206.

In one exemplary embodiment, the fibers 206 may be hollow, porous tubes having a membrane layer that may be coated or integrally formed on the tubes. These tubular fibers 206 may be adapted to receive fluid flow into their ends. The fibers 206 may be asymmetric and may be, for example, of composite construction having a dense membrane fiber layer coated onto the inside or outside of an asymmetric tube. Alternatively, the fibers 206 may include an integrally skinned construction with a tube and a dense membrane fiber layer integrally formed during the manufacturing process.

Different gases present in the intake flow permeate through the side walls of the fibers 206 of the membrane cartridge 128 at different permeation rates. The permeation rate is the rate at which certain molecules pass through the walls of the fibers 206. Selected gases, such as, for example, hydrogen, helium, water vapors, carbon dioxide, and oxygen may tend to permeate outwardly through the fiber walls and from the membrane cartridge 128 at a relatively fast rate while other gases, such as, for example, carbon monoxide, argon, and nitrogen permeate less rapidly. Accordingly, the less-rapidly-permeating gases are mostly retained and transported along the interior of the fibers 206, exiting the ends of the fibers 206 at the second end 204 of the membrane cartridge 128. Altering or controlling the pressure of the intake flow entering the separation device 126 may be a factor for controlling the permeation rate of certain molecules, such as, for example, oxygen molecules, that may pass through the walls of the fibers 206.

The bypass passage 214, formed by the bypass tube 216, may extend through the center of the membrane cartridge 128 from the first end 202 to the second end 204. Accordingly, the bypass passage 214 may form a path through which a portion of the intake flow bypasses treatment by the membrane cartridge 128. The portion of the intake flow that passes through the bypass passage 214 is referred to herein as the bypass flow. The bypass passage tube 216, defining the bypass passage 214, may be substantially impervious to fluids, such as gases, so that fluid may not pass from the bypass passage 214 to the fibers 206, and vice versa.

A bypass flow regulator 312 may be located within the bypass passage 214. The bypass flow regulator 312 may restrict the fluid flow in the bypass passage 214 to force more flow through the membrane fibers 206. Accordingly, the bypass flow regulator 312 may aid in establishing desired flow rates and the flow ratios of fluid through the bypass passage 214 and the fibers 206.

The bypass flow regulator 312 may be securely fixed to the bypass tube 216 in the bypass passage 214 or otherwise configured to regulate the bypass flow. In the exemplary embodiment of FIG. 2, the bypass flow regulator 312 is an orifice plate. The size of the orifice determines the ratio of intake flow that flows through the bypass passage 214 and intake flow that flows into the fibers 206.

In another exemplary embodiment, the bypass flow regulator 312 is a flow control valve. The flow control valve could be an adjustable control valve or an on-off valve. An adjustable control valve can control flow to maintain a desired flow ratio between the bypass flow and the separation flow despite changes in fluid pressure of the intake flow, thereby providing more precise control by the separation device 126.

Although the bypass flow regulator 312 is shown adjacent the second end 204 of the membrane cartridge 128, the bypass flow regulator 312 may be secured at any location so long as it controls fluid flow through the bypass passage 214. In one exemplary embodiment, the walls of the bypass tube 216 extend beyond one or both of the ends of the membrane cartridge 128. Accordingly, the bypass passage 214 is longer than the length of the membrane cartridge 128 itself. In this embodiment, the bypass flow regulator 312 may be secured within the bypass passage 214 in a region not physically within the membrane cartridge 128. In another exemplary embodiment, the bypass flow regulator is a laminar flow device which matches the pressure drop characteristics of the membrane fibers. With this laminar flow device, a constant flow split can be maintained at all loads and speeds without additional control devices.

In one exemplary embodiment, the bypass flow regulator 312 is adapted so that between about 20% to 80% of the intake flow passing through the feed port 304 enters the bypass passage 214, forming the bypass flow. The remaining portion of the intake flow enters the tubular fibers 206. The intake flow that enters the tubular fibers 206 is referred to herein as the separation flow. Accordingly, in this exemplary embodiment, the intake flow is split into the bypass flow and the separation flow. The bypass flow regulator 312 may be adapted to cause a pressure drop across the membrane cartridge 128 and bypass passage 214 that will drive the desired flow ratio. The actual pressure drop required will depend on the engine system requirements, but is typically in the 1–2 psi range.

The outer wrap 208 of the membrane cartridge 128 may cover at least a portion of the periphery of the membrane cartridge 128 containing the fibers 206. In one exemplary embodiment, the outer wrap may be, for example, a cellophane sheet. A region of the membrane cartridge 128 may be left uncovered by the outer wrap 208. This uncovered region is referred to herein as a gap 210. The gap 210 may allow fluid that has passed through the wall of the fibers 206 to exit the membrane cartridge 128, and enter into the isolated region 306.

The isolated region 306 may be the annular region between the exterior of the membrane cartridge 128 and the housing 302, and may be accessible to only fluid flow that passes through the gap 210. O-rings (not shown) may be provided between the tube sheets 212 and the housing 302 to seal the isolated region 306, and eliminate leaking of fluid into the isolated region 306 from the edges of the tube sheets 212.

The housing 302 may include the permeate flow port 308 in fluid communication with the isolated region 306 to release fluid from the isolated region 306. The permeate flow regulator 310 may be associated with the permeate flow port 308 for regulating the flow rate of the fluid flow from the isolated region 306. The permeate flow regulator 310 may be, for example, an adjustable flow control valve, which may be actuated to control the rate of fluid flow from the isolated region 306.

The permeate flow regulator 310 may be located at or proximate to the permeate flow port 308 of the housing 302. Such an arrangement ensures a relatively rapid change in the composition of the engine flow when the permeate flow regulator 310 is operated, for example, adjusted, opened, or closed.

Industrial Applicability

After passing through the feed port 304, the intake fluid flow may split into the bypass flow and the separation flow. The bypass flow may enter the bypass passage 214 and pass untreated through the membrane 128. The separation flow may enter into the ends of the fibers 206 at the first end 202 of the separation membrane cartridge 128, and may be subsequently separated by the membrane cartridge 128 into a permeate flow and a retentate flow. The permeate flow may permeate through the walls of the fibers 206 and exit the membrane cartridge 128 through the gap 210 into the isolated region 306. The retentate flow may pass through the tubular fibers 206 and exit the membrane cartridge 128 at the second end 204. In one exemplary embodiment, the retentate flow comprises about 80–85% of the separation flow, and the permeate flow comprises about the remaining 15–20%. One skilled in the art would recognize that the relative percentages of the retentate and permeate flows may vary depending upon the particular application.

The permeate flow regulator 310 may be used to control the flow rate at which the permeate flow exits the membrane cartridge 128 through the gap 210, thereby controlling the relative concentrations of the permeate gas. The permeate flow regulator 310 may regulate the permeation rate of the permeate flow through the fibers 206 of the membrane cartridge 128.

Additionally, by controlling the flow rate of the permeate flow, the permeate flow regulator 310 may indirectly control the flow rate of the retentate flow, which is combined with the bypass flow and fed to the intake manifold 106 and to the combustion cylinders 116 in the engine 102. Selective operation of the permeate flow regulator 310 allows the engine 102 to operate in different fluid modes, including, for example, a retentate-enriched mode, wherein the permeate flow regulator 310 is partially or fully open, and a standard intake air mode, wherein the permeate flow regulator 310 is closed.

The retentate flow from the fibers 206 and the bypass flow from the bypass passage 214 may converge to make up the engine flow in a mixing region 314. The mixing region 314 may be formed in the housing 302 proximate the second end 204 of the membrane cartridge 128, and may be formed in the housing as an in-line region for joining the two flows. Because the retentate flow is treated by the fibers 206 as it passes through the membrane cartridge 128, it is no longer the same composition as the intake flow. The retentate flow is now enriched as a result of the permeate flow being removed from the separation flow. The bypass flow, on the other hand, may be untreated by the membrane cartridge 128 and thus may maintain the same composition as the intake flow. In the mixing region 314, the retentate flow may be mixed with the bypass flow to create the engine flow, having a desired fluid mixture. The engine flow may exit the housing 302 through the exit port 316. In one exemplary embodiment, the engine flow is a nitrogen-enriched flow having a nitrogen content of about 79.5–82%. Thus, in this embodiment, about 18–20.5% of the engine flow may be oxygen and other gases.

The fluid separation system 100, having a separation membrane cartridge 128, enables engine manufacturers to satisfy increasingly stringent exhaust and emission regulations by reducing the emission of $NO_X$ particles into the environment. The separation system 100 may alter the air mixture flowing into a combustion engine from ambient intake air to a desired mixture, such as, for example, a nitrogen-enriched air mixture, that may produce less $NO_X$ when the air is combusted.

The separation system 100 is an in-line system, enabling the fluids to be mixed as the fluid passes through a single conduit. Accordingly, the system is compact, and can be used on engines having a limited amount of space within a vehicle body or on engines that may be subject to other size constraints. Furthermore, because the system requires only a single conduit, the system is comparatively inexpensive, requiring a minimal amount of extra materials. Further, because the system requires only a single conduit, the system is easy to maintain and manufacture.

The separation system 100 may be used on a variety of engines, for example, diesel-powered, internal combustion engines for powering highway trucks. Additionally, the separation system 100 may be used on other large internal combustion engines for use in work machines, such as tractors, loaders, dozers, and the like. Furthermore, the separation system 100 may be used on automobile engines, or any other combustion engine, to regulate the fluid flow in order to reduce $NO_X$, thereby meeting and/or exceeding government-established emission regulations.

It will be apparent to those skilled in the art that various modifications and variations can be made to the disclosed separation device without departing from the scope of the present invention. Other embodiments will be apparent to those skilled in the art from consideration of the specification and practice of the invention disclosed herein. It is intended that the specification and examples be considered as exemplary only, with the true scope of the invention being indicated by the following claims.

What is claimed is:

1. A separation membrane cartridge configured to separate an intake air flow of an engine into a membrane flow and a bypass flow, the membrane cartridge comprising:
    a fibrous section including a plurality of fibers extending from a first end of the membrane cartridge to a second end of the membrane cartridge, the fibers being configured to separate at least a portion of the membrane flow into a permeate flow and a retentate flow; and
    a bypass passage extending from the first end to the second end to allow passage of the bypass flow through the membrane cartridge.

2. The membrane cartridge of claim 1, further including a bypass flow regulator associated with the bypass passage, the bypass flow regulator being configured to control the bypass flow through the passage.

3. The membrane cartridge of claim 2, wherein the bypass flow regulator is one of an orifice plate and a flow-control valve.

4. The membrane cartridge of claim 1, wherein the bypass passage extends beyond the first and second ends of the membrane cartridge.

5. The membrane cartridge of claim 1, wherein the fibers are configured to separate at least some oxygen molecules from at least some nitrogen molecules, and wherein the oxygen molecules form a part of the permeate flow.

6. The membrane cartridge of claim 1, further including an outer wrap, the outer wrap covering a first portion of the membrane cartridge, wherein a second portion of the membrane cartridge includes a gap configured to communicate the permeate flow outside of the membrane cartridge.

7. A separation system configured to separate an intake air flow to create a desired air mixture for an engine, the system comprising:
    a housing having a feed port configured to receive an intake air flow and an exit port configured to output an engine flow;
    a separation membrane cartridge in the housing, the separation membrane cartridge being configured to separate a first portion of the intake air flow into a permeate flow and a retentate flow; and
    a bypass passage extending through the membrane cartridge from a first end of the membrane cartridge to a second end of the membrane cartridge to allow passage of a second portion of the intake air flow through the membrane cartridge.

8. The system of claim 7, wherein the separation membrane cartridge includes a fibrous section having a plurality of fibers extending from the first end of the membrane cartridge to the second end of the membrane cartridge, the fibers being configured to separate at least the first portion of the intake air flow into the permeate flow and the retentate flow.

9. The system of claim 7, further including a bypass flow regulator in the bypass passage, the bypass flow regulator being configured to regulate the bypass flow.

10. The system of claim 9, wherein the bypass flow regulator is one of an orifice plate and a flow-control valve.

11. The system of claim 7, further including:
a permeate flow port in the housing, the permeate flow port being adapted to receive the permeate flow; and
a permeate flow regulator in the permeate flow port, the permeate flow regulator being configured to regulate the permeate flow from the housing.

12. The system of claim 11, further including an isolated region between an outer surface of the membrane cartridge and the housing, the isolated region being configured to receive the permeate flow, wherein the permeate flow port is in fluid communication with the isolated region.

13. The system of claim 7, further including a flow regulator in the feed port configured to control the intake air flow into the housing.

14. The system of claim 7, wherein the membrane cartridge includes an outer wrap, the outer wrap covering a first portion of the membrane cartridge, wherein a second portion of the membrane cartridge includes a gap configured to communicate the permeate flow outside of the membrane cartridge.

15. The system of claim 7, further including a mixing region within the housing, wherein the retentate flow and the bypass flow are mixed at the mixing region to create the engine flow.

16. The system of claim 7, wherein the permeate flow is oxygen-enriched and the retentate flow is nitrogen-enriched.

17. The system of claim 7, further including an internal combustion engine having an engine intake manifold in fluid communication with the exit port.

18. A method of creating a desired air mixture for an engine, comprising:
receiving an intake flow into a housing;
separating a first portion of the intake flow into a permeate flow and a retentate flow;
passing a second portion of the intake flow through a bypass passage extending through a membrane cartridge;
mixing the retentate flow and the second portion of the intake flow to create an engine flow; and
outputting the engine flow from the housing to the engine.

19. The method of claim 18, wherein the retentate flow is a nitrogen-enriched flow and the permeate flow is an oxygen-enriched flow.

20. The method of claim 18, further including regulating the bypass flow through the bypass passage.

21. The method of claim 18, further including releasing the permeate flow from the housing.

22. The method of claim 18, further including controlling the retentate flow by controllably releasing the permeate flow from the housing.

* * * * *